US012633442B2

(12) United States Patent
Franken et al.

(10) Patent No.:  US 12,633,442 B2
(45) Date of Patent:      May 19, 2026

(54) ELECTRICAL STEEL STRIP, USE OF AN ELECTRICAL STEEL STRIP AND METHOD FOR PRODUCING AN ELECTRICAL STEEL STRIP

(71) Applicant: Wickeder Westfalenstahl GmbH, Wickede (DE)

(72) Inventors: Carina Franken, Arnsberg-Oeventrop (DE); Jürgen Platt, Düsseldorf (DE)

(73) Assignee: Wickeder Westfalenstahl GmbH, Wickede (DE)

( * ) Notice: Subject to any disclaimer, the term of this patent is extended or adjusted under 35 U.S.C. 154(b) by 195 days.

(21) Appl. No.: 18/557,824

(22) PCT Filed: Apr. 28, 2022

(86) PCT No.: PCT/EP2022/061304
§ 371 (c)(1),
(2) Date: Oct. 27, 2023

(87) PCT Pub. No.: WO2022/229305
PCT Pub. Date: Nov. 3, 2022

(65) Prior Publication Data
US 2024/0212910 A1      Jun. 27, 2024

(30) Foreign Application Priority Data
Apr. 30, 2021     (EP) ..................................... 21171575

(51) Int. Cl.
*H01F 27/25*          (2006.01)
*B23K 20/02*          (2006.01)
(Continued)

(52) U.S. Cl.
CPC ............. *H01F 27/25* (2013.01); *B23K 20/02* (2013.01); *B23K 20/04* (2013.01); *B23K 20/227* (2013.01);
(Continued)

(58) Field of Classification Search
CPC ......... H01F 27/25; B23K 20/02; B23K 20/04; B23K 20/227; B32B 15/011; B32B 15/04; B32B 15/18; B32B 15/20
(Continued)

(56) References Cited

U.S. PATENT DOCUMENTS 3,682,606  A  *  8/1972  Anderson ............... C22C 47/20
                                                      228/262.44
2014/0366988  A1     12/2014  Dorninger et al.
(Continued)

FOREIGN PATENT DOCUMENTS

CN          103534770 A       1/2014
CN          108884535 A       11/2018
(Continued)

*Primary Examiner* — Tahseen Khan
(74) *Attorney, Agent, or Firm* — The Webb Law Firm

(57) ABSTRACT

The invention relates to an electrical strip with at least one functional layer at least partially consisting of a ferromagnetic material, with at least one additional layer at least partially consisting of a non-magnetisable material. The at least one additional layer and the at least one functional layer are bonded to one another by an adhesive bond with atomic diffusion and/or in that at least one functional layer has a thickness in the range from 2 to 100 µm, preferably from 2 to 60 µm. The invention also relates to a use of such an electrical strip as an iron core and to a method of manufacturing an electrical strip. The invention solves the object of providing an electrical strip and a method for producing an electrical strip which improves the disadvantages described for the prior art and, in particular, increases the efficiency of energy conversion in an application as an inductive component.

15 Claims, 10 Drawing Sheets

(51) Int. Cl.

| | |
|---|---|
| *B23K 20/04* | (2006.01) |
| *B23K 20/227* | (2006.01) |
| *B32B 15/01* | (2006.01) |
| *B32B 15/04* | (2006.01) |
| *B32B 15/18* | (2006.01) |
| *B32B 15/20* | (2006.01) |
| *H01F 41/02* | (2006.01) |

(52) U.S. Cl.
CPC ............ *B32B 15/011* (2013.01); *B32B 15/04* (2013.01); *B32B 15/18* (2013.01); *B32B 15/20* (2013.01); *B32B 2250/05* (2013.01); *B32B 2307/208* (2013.01); *B32B 2307/302* (2013.01); *B32B 2307/7376* (2023.05); *H01F 41/0213* (2013.01)

(58) Field of Classification Search
USPC ........................................................ 428/216
See application file for complete search history.

(56) References Cited

U.S. PATENT DOCUMENTS

2017/0014942 A1    1/2017   Nanbu et al.

2019/0271053 A1    9/2019   Georgeou et al.
2019/0333674 A1*  10/2019   Quilici ................ H05K 3/4611
2021/0407732 A1   12/2021   Hecht et al.

FOREIGN PATENT DOCUMENTS

| | | |
|---|---|---|
| CN | 110257736 A | 9/2019 |
| CN | 111295427 A | 6/2020 |
| CN | 111670480 A | 9/2020 |
| DE | 102018102422 A1 | 8/2018 |
| EP | 3127647 A1 | 2/2017 |
| JP | 2009248125 A | 10/2009 |
| JP | 2010136529 A | 6/2010 |
| JP | 2015196178 A | 11/2015 |
| JP | 2020511005 A | 4/2020 |
| KR | 10-2016-0138985 A | 12/2016 |
| WO | 2018019602 A1 | 2/2018 |
| WO | 2018145780 A1 | 8/2018 |
| WO | 2018157946 A1 | 9/2018 |

* cited by examiner

| 1 | 2 | 3 | 4 | 5 | 6 | 7 |
|---|---|---|---|---|---|---|
| basic material | electrical Conductivity $\kappa$ [m $\Omega$ (mm)$^{-2}$] | density of material $\rho$ [kg m$^{-3}$] | Composition (FL: function layer, ZL: additional layer) | sheet thickness d [mm] | eddy current loss factor $k_{wirbel} = \kappa \, d^2/(6\rho)$ | reduction of eddy current loss [%] |
| R1 | 7,7 | 7,85 | 0,5 mm FL | 0,5 | 40,8705 | reference |
| E1 | 12,13 | 7,955 | 16 layers (8×10 µm ZL and 8×53 µm FL) | 0,5 | 4,4113 | 89% |
| E2 | 10,33 | 7,335 | 16 layers (8×10 µm ZL and 8×53 µm FL) | 0,5 | 5,3113 | 87% |
| Austenit1 | 7,05 | 7,85 | 16 layers (8×10 µm ZL and 8×53 µm FL) | 0,5 | 3,6527 | 91% |
| Austenit2 | 7,05 | 7,85 | 16 layers (8×10 µm ZL and 8×53 µm FL) | 0,5 | 3,6527 | 91% |

Fig.3a

| 1 | 2 | 3 | 4 | 5 | 6 | 7 | 8 |
|---|---|---|---|---|---|---|---|
| basic material | density of material $\rho$ [kg m$^{-3}$] | measured coercivity $H_c$ [A/m] | | measured hysteresis loss $P_{hyst}$ [W/kg] | | reduction of hysteresis loss [%] | |
| | | $f = 1$ kHz | $f = 10$ kHz | $f = 1$ kHz | $f = 10$ kHz | $f = 1$ kHz | $f = 10$ kHz |
| R1 | 7,85 | 2.725 | 6.497 | 2404 | 40614 | Referenz | |
| R2 | 7,85 | 2.744 | 6.403 | 2592 | 40408 | | Referenz |
| E1 | 7,955 | 3.403 | 6.563 | 2074 | 22964 | 14% | 43% |
| E2 | 7,355 | 1.927 | 4.998 | 1580 | 35617 | 34% | 12% |
| Austenit1 | 7,85 | 2.514 | 5.457 | 2071 | 39864 | 14% | 1% |
| Austenit2 | 7,85 | 2.398 | 5.507 | 1961 | 39287 | 18% | 3% |

ELECTRICAL STEEL STRIP, USE OF AN ELECTRICAL STEEL STRIP AND METHOD FOR PRODUCING AN ELECTRICAL STEEL STRIP

CROSS-REFERENCE TO RELATED APPLICATIONS

This application is the United States national phase of International Application No. PCT/EP2022/061304 filed Apr. 28, 2022, and claims priority to European Patent Application No. 21171575.0 filed Apr. 30, 2021, the disclosures of which are hereby incorporated by reference in their entireties.

BACKGROUND OF THE INVENTION

Field of the Invention

The invention relates to an electrical strip with at least one functional layer at least partially consisting of a ferromagnetic material and with at least one additional layer at least partially consisting of a non-magnetisable material. The invention also relates to the use of an electrical strip and to a method of manufacturing an electrical strip.

Description of Related Art

Electrical sheets and electrical strips are widely used in electrical systems of all kinds, for example for power generation in generators, in power transmission and distribution in transformers, in energy recovery in motors and other electrical machines, and in other applications in the field of electrical engineering.

Electrical strips are processed in particular as inductive components such as magnetic cores of electrical machines or in transformers. Electrical strip is generally understood to be rolled strip made of a magnetic material, for example iron-silicon alloys. After a multi-stage manufacturing process, which includes, for example, steel production, hot strip or cold strip treatment and, if necessary, heat treatment and strip coating, as well as the skin-passing and straightening (stretch-bend straightening) of the strips in the finishing lines, the electrical strip is cut longitudinally to widths for use and processed into electrical sheets, i.e. individual parts of an electrical strip, by punching, etching, eroding, wire eroding, cutting, water-jet cutting or laser cutting.

In further method steps, the electrical sheets are then layered, packaged and fixed to form electromagnetic components, in particular sheet laminations. These electromagnetic components are used in electrical systems such as generators, transformers, electric motors and other magnetic applications as magnetic cores in the form of stators, rotors, transformers and other magnetic cores in relays, switches, contactors, chokes, ignition coils, electricity meters and controllable deflection magnets.

Numerous characteristics such as its geometrical, mechanical-technological and other material properties are of great importance for the targeted use of electrical sheet in the relevant fields of application. However, its behaviour in the electromagnetic field is particularly important for the function of the respective component. An electrical sheet is usually made of so-called soft magnetic materials, i.e. materials that are particularly easy to magnetise in the external magnetic field and thus make optimal use of the energy when used in electrical systems.

The magnetisability of a material is described by the material-dependent absolute permeability $\mu$. The relationship between the magnetic field strength H acting on a magnetic material and the magnetic flux density generated in the magnetic material by His as follows $B=\mu H$. In empty space $B=\mu_0 H$ where $\mu_0$ is the so-called magnetic field constant. The dimensionless quantity $\mu_r=\mu/\mu_0$ which is called the permeability number or relative permeability, characterises the magnetic behaviour of a material. Ferromagnetic materials are materials for which the following applies $\mu_r \gg 1$ which thus amplify the external magnetic field inside the material. For the construction of electrical machines, mainly ferromagnetic materials are important due to their field-amplifying effect.

The magnetisability of a ferromagnetic material is described by the course of the B vs. H curve. A changing magnetic field strength H leads to movements and growth processes of the magnetic domains, i.e. microscopic areas in a ferromagnetic material within which the individual atomic or molecular magnetic particles are oriented in the same way, inside the ferromagnetic material. Due to these processes taking place inside the magnetic material, a course of B vs. H results with increasing magnetic field strength H, which differs from that with decreasing magnetic field strength. This deviating curve is called hysteresis.

The types of electrical strips are determined by the course of the characteristic curve B vs. H, whereby the ascending branch of the characteristic curve, the course of B with increasing magnetic field strength H, merges with the descending branch of the characteristic curve, the course of B with decreasing magnetic field strength, at the end points to form a hysteresis loop. The area of the hysteresis loop describes the energy required to remagnetise the magnetic material.

When the external magnetic field H is switched off, a certain value of the magnetic polarisation/of the portion of the flux density B caused by the magnetic material remains. This value is called magnetic remanence $B_r$. The width of the hysteresis is determined by the coercivity $H_c$, the field strength necessary to bring the flux density to zero. During remagnetisation, the material state passes through a closed hysteresis loop, the area of which represents the amount of energy (heat) released to the environment per volume of material per remagnetisation cycle.

The magnetic behaviour of a component in an electrical system thus has a decisive influence on its efficiency and thus on energy consumption. Increased efficiency and thus improved energy conversion can be achieved through application-related optimisation, especially with regard to the magnetic properties of the electrical sheet, and here in particular with regard to the core loss. Re-magnetisation loss or iron loss is the term used to describe the heat loss in the magnetic material that occurs in alternating magnetic fields due to the change in magnetisation. The change in magnetisation can be caused by alternating currents or by the movement of the magnetic field or the component made of magnetic material. For example, the rotor of a DC machine also experiences an alternating magnetic field.

Up to now, an electrical strip has been produced in thicknesses ranging from 1 mm to 0.5 mm, in some cases down to 0.1 mm. Electrical strip with the most isotropic properties possible is used for applications in electrical engineering in which the magnetic flux is not fixed in any particular direction. For such a non-grain-oriented (NO) electrical strip, a polycrystalline structure with grain sizes between 20 $\mu$m and 200 $\mu$m is the ideal structure. For applications where a particularly low remagnetisation loss is important and particularly high demands are made on permeability or polarisation, an electrical strip with uniform orientation of the crystallographic texture, which is referred to as grain-oriented (KO) electrical strip, is usually used.

In the case of remagnetisation losses, a distinction is essentially made between eddy current losses and hysteresis losses. Hysteresis losses refer to the losses that describe the work required to shift the magnetic domains during the remagnetisation of a magnetic material. This loss is proportional to the area of the hysteresis loop traversed by the B vs. H curve and is described by $P_{hyst}=(k_H 4H_C B_{max} f)/\rho$ where $k_H$ describes the form factor, which depends on the geometry of the material and the influences of the stress during processing (e.g. punching, bending, drawing). Furthermore, $H_c$ denotes the coercivity, $B_{max}$ the amplitude of the magnetic induction in the material, f the remagnetisation frequency and p the material density of the material.

If an electrically conductive body is exposed to a changing magnetic field, an electric voltage is induced, which in turn causes an electric current. The current heat losses generated by this current are called eddy current losses and are calculated according to $P_{eddie}=k_{eddie}(B_{max} f \pi)^2$ with the material-dependent quantity $k_{eddie}=\kappa d^2/(6\rho)$ also called eddy current loss factor, where $\kappa$ represents the specific conductance (electrical conductivity) of the material, d the thickness of the electrical sheet and p the material density of the material of the electrical sheet.

The magnetic properties and in particular the re-magnetisation losses of electrical sheets are therefore essentially determined by material-specific parameters as well as the thickness of the electrical sheet. Iron cores made of solid material are hardly usable due to high eddy current losses; in addition, the core becomes hot due to eddy currents with increasing frequency. To avoid this and to reduce the core loss, iron cores for electrical machines are designed as laminated, i.e. stacked and insulated electrical sheets in packages or as wound cut strip cores.

To effectively suppress the formation of eddy currents, the laminations of electrical sheet are provided with an insulating coating, for example of lacquer. The thicknesses of such insulating layers are in the range of a few µm, typically the individual sheets are coated on each side with a 1-2 µm thick layer of insulating lacquer and have a certain roughness. If the electrical sheets are now stacked and connected, the stack is composed primarily of electrical sheet, but also lacquer and air pockets. The entire volume of the stack, also called the package, is therefore not completely filled by the material of the magnetic material.

The eddy current losses that occur also decrease with decreasing thicknesses of the electrical sheet. However, the production of thin electrical strips places increased demands on the manufacturing process. In addition, it should be noted that the ratio between the magnetisable material of the electrical sheet and the non-magnetisable material of the coating develops unfavourably with very small thicknesses of the electrical sheet: the more coating there is on the electrical sheet surface in relation to its thickness, the less iron is contained in a sheet package of a certain height. This ratio is worse the thinner the electrical strip is, the ratio of sheet metal to paint thickness becomes smaller and smaller, and above a certain point the positive effect of using particularly small thicknesses of electrical strip decreases.

Therefore, an electrical strip is manufactured in different thicknesses due to the requirements of the market and then further processed into electrical sheets. By laminating the electrical strip lamellae into cores, very tight tolerances are required with regard to the sheet or strip thickness, especially for large core heights. Non-grain-oriented electrical strip is mainly produced in thicknesses of 0.50 mm and 0.65 mm, but 0.35 mm and 1.00 mm are also common. For grain-oriented electrical strip, the common thicknesses are 0.35 mm, 0.30 mm, 0.27 mm and 0.23 mm. Furthermore, electrical strips with a nominal thickness of 0.1 mm are known.

Another important method to reduce the core loss is to use adapted alloys. For example, the core loss can be reduced by adding silicon, since the specific electrical resistance of the magnetic material increases with increasing silicon content and thus the conductivity is reduced. However, since an increasing silicon content is detrimental to the cold formability of the electrical strip and commercial electrical strip is usually cold rolled, this results in increased requirements for the manufacturing and production process. Therefore, a silicon content with a mass fraction of 3.5% is usually not exceeded.

Other suitable measures for improving the material properties of electrical sheets, besides reducing the sheet thicknesses and using adapted alloys, are the adjustment of favourable microstructure properties, especially with regard to grain size and texture. However, this adjustment in turn has a mostly negative influence on the mechanical properties and thus the processability of the electrical sheet.

WO 2018/157946 A1 describes a composite material with two grain-oriented electrical strip layers with layer thicknesses of 50 to 1500 µm, which is produced by coating an electrical strip layer with a polymeric agent and subsequently laminating two electrical strip layers.

WO 2018/019602 A1 describes a steel strip for the production of a non-grain-oriented electrical sheet with an insulation layer, which has a final thickness of at least 100 µm.

U.S. Pat. No. 3,682,606 A discloses an aluminum-steel composite material described for the construction of lightweight vehicle structures or their armor.

EP 3 127 647 A1 describes the production of a metal laminate material of different materials by joining two sheets by roll pressure bonding.

DE 10 2018 102422 discloses the use of a composite material for shielding against electric and magnetic fields.

SUMMARY OF THE INVENTION

Therefore, the present invention is based on the object of providing an electrical strip of the type mentioned at the beginning as well as a method for producing an electrical strip which improves the disadvantages described for the prior art and, in particular, increases the efficiency of energy conversion in an application as an inductive component.

According to a first teaching, the aforementioned object is solved by an electrical strip with the features as described herein.

In the following, an electrical strip is understood to be, for example, an at least two-layer electrical strip, or also an at least two-layer electrical sheet cut from this electrical strip. An electrical strip can also be an electrical sheet. Due to their ferromagnetic properties, electrical strips or electrical sheets of the specified type are used as inductive components in electrical machines or in transformers or transformers.

In principle, the properties of the electrical strip described below already result from the small number of layers mentioned. For example, two functional layers with an additional layer between them are preferred. Furthermore, three to ten functional layers can be provided with two to nine additional layers arranged in between. As described below, two functional layers can also be adjacent to each other, which are then separated from other functional layers by additional layers.

Furthermore, an electrical strip is preferably made of a plurality of functional layers and additional layers, which are arranged adjacent to each other, preferably alternately. Typically, 10 to 100 functional layers with a corresponding number of additional layers can be present in a stack. However, the number of layers is not limited in principle, provided that production is possible.

Within the scope of the invention, it was recognised that by means of the composite of the at least one functional layer and the at least one additional layer by adhesive bonding with atomic diffusion, an electrical strip with improved material properties, in particular with improved magnetic properties, can be provided. By means of such a bond, internal stresses at the transition of the bond partners involved and thus in the interior of the electrical strip or electrical sheet can be reduced.

A bond by adhesive bonding with atomic diffusion is understood to be a bond between two bonding partners in which a transition layer is formed as a bonding zone by atomic diffusion of the materials of the bonding partners, via which a continuous adjustment of the material properties takes place. The adhesive bond with atomic diffusion thus arises through the formation of the transition layer between the layers.

In the transition layer, the atoms of the bonding partners are gradually mixed, the formation of a bond takes place through space change processes (diffusion) in the transition layer, also called the bonding zone. This transition layer causes the reduction of internal tensions. The extent of the transition zone depends on the respective bonding partners used, especially the diffusion properties of the materials involved.

To characterise the adhesive bond with atomic diffusion, i.e. the binding zone of the adhesive bond in the transition layer, and the properties, analyses can be applied using various methods. These methods include optical light microscopy, transmission electron microscopy (TEM), scanning electron microscopy (SEM), energy dispersive X-ray spectroscopy (EDS), secondary ion mass spectrometry (SIMS) and analyses of microhardness profiles.

Such a composite may be referred to as a cladding composite, for example. Preferably, the two bonding partners are metallic materials and the cladding composite represents a metallic connection of the two bonding partners or cladding partners. However, composites between metallic materials and non-metallic materials, for example carbon-containing materials, or between non-metallic bonding partners, for example plastics, are also possible. The bonding partners of the composite are predominantly arranged in layers adjacent to each other. The bonding of the bonding partners in the cladding composite can be carried out by means of cladding. For this purpose, the cladding can be carried out by cold roll cladding or hot cladding.

Alternatively, the bond partners can also be joined by welding metal packages, in particular diffusion welding or electric welding, or by packaging and partial welding. Furthermore, production by means of sintering or hot isostatic pressing (HIP) is possible.

According to the invention, the at least one functional layer consists at least partially, preferably completely, of a ferromagnetic material, in particular of iron, nickel, cobalt, other ferromagnetic materials, alloys thereof or a cladding of two or more of these materials. Even in the case of basically paramagnetic materials such as copper, for example, it is known that ferromagnetic properties can be induced by appropriate processing of the metal. In this case, such a material is also suitable for the production of the functional layer.

The design of the functional layer as a continuous layer is desired and preferred in this respect in order to achieve the properties of the functional layer in the best possible way. However, the functional layer can also be designed as a non-continuous layer, since the continuity of the layer cannot be completely guaranteed during production. On the other hand, depending on the materials used, the production of a functional layer designed as a non-continuous layer can also be aimed for, so that the material of the additional layer at least partially penetrates the material of the functional layer. In this way, further properties of the composite, such as conductivity or durability, can be improved. The material of the functional layer can also have other, non-ferromagnetic components and inclusions.

Likewise, the at least one additional layer consisting at least partially, preferably completely, of a non-magnetisable material is understood to be a layer which is formed as a continuous layer or as a non-continuous layer. It also applies here that a continuous layer is desired and in this respect preferred in order to achieve the properties of the additional layer in the best possible way. The at least one additional layer can also contain other materials in addition to a non-magnetisable material. In particular, both the at least one functional layer and the at least one additional layer can contain open or closed pores, for example air pores.

The at least one additional layer may itself consist of one layer or at least two layers. Preferably, the at least one additional layer is a clad material or a multilayer composite material. Particularly preferably, the at least one additional layer comprises a mica layer or a graphene layer on a metal layer of copper or aluminium. A fibre composite material, a ceramic material or a layered silicate (mica) can also be used as the material of the at least one additional layer, whereby in particular electrical insulation can be introduced into the composite of the electrical strip or electrical sheet.

In particular, the provision of such an at least one additional layer can also advantageously influence the material properties, such as the magnetic properties of the electrical strip, if the additional layer is designed as a non-continuous additional layer. A non-continuous additional layer enables contact of the functional layers arranged on both sides of the at least one additional layer.

Alternatively, the at least one additional layer is preferably formed as a continuous layer, so that contact of the functional layers arranged on both sides of the at least one additional layer is prevented. Both the provision of a continuously formed at least one additional layer and the provision of a non-continuously formed at least one additional layer can have a particularly good influence on the material properties and in particular the magnetic properties of an electrical strip. In particular, the core losses of the electrical strip can be reduced.

The material of at least one functional layer may comprise an iron-silicon alloy. Such alloys have proven to be advantageous materials, in particular with regard to re-magnetisation losses, for electrical strips and in particular for electrical sheets. The functional layer may have a grain-oriented microstructure or a non-grain-oriented microstructure. In addition, the material of at least one functional layer can also have other iron (Fe) alloys as well as alloys of cobalt (Co), aluminium (Al) and/or nickel (Ni).

In a preferred manner, the production of the functional layers aims to generate as many large grains as possible, preferably up to grain sizes in the size of the layer thickness. In addition, depending on the material of the additional layer, the diffusion of elements and their implementation in the crystal lattice of the material of the functional layer is possible.

By means of the composite described above, an electrical strip comprising functional layers and/or additional layers made of different materials, preferably comprising functional layers made of different ferromagnetic materials and additional layers made of different non-magnetisable materials, can be provided. The different materials can in particular have different material properties, for example different properties regarding the electrical conductivity or the thermal conductivity as well as the material density. In this way, a specific selection of the material properties is possible, which, if advantageously chosen and combined, can improve in particular the magnetic properties of the electrical strip.

Within the scope of the invention, it was recognised in particular that the reversal losses, in particular the hysteresis and eddy current losses, can be reduced by the composite according to the invention by means of adhesive bonding with atomic diffusion. Preferably, the introduction of additional layers reduces the material specific characteristic numbers significant for the electric strip, in particular $\rho$ and $\kappa$, relevant for the eddy current losses, given by $$P_{eddie} = \left( \frac{\kappa d^2}{6\rho} \right) (B_{max} f \pi)^2$$

and the hysteresis losses, given by $P_{hyst} = (k_H 4 H_C B_{max} f)/\rho$ of an electrical strip in such a way that the core losses are reduced overall. A reduction of the core losses, in particular both the hysteresis and the eddy current losses, was observed at frequencies in the range of 1 kHz to 10 kHz. The possible frequency range depends on the specific material of the functional layer and/or the additional layer.

A reduction of the hysteresis losses could be observed in particular by a reduction of the area of the traversed hysteresis loop of the B vs. H curve of the composite according to the invention with at least one functional layer and with at least one additional layer compared to measurements of a comparably thick electrical sheet without additional layers. Furthermore, the coercivity can be influenced by means of the composite through atomic adhesion bonding with atomic diffusion. Concerning the reduction of eddy current losses, a reduction of the eddy current loss factor $k_{eddie} = \kappa d^2/(6\rho)$ was observed.

Furthermore, by providing at least one additional layer made of a non-magnetisable material, other material properties of the electrical strip can be specifically influenced in addition to the magnetic properties. For example, it is possible to achieve a weight reduction of the electrical strip by using at least one additional layer with a lower material density p compared to the material density p of the material of the functional layers. A reduction in the weight of the electrical strip advantageously leads to a further improvement in the energy efficiency of an electrical strip, in particular when used as an electrical sheet in moving components.

In addition, the thermal conductivity of the electrical strip can be specifically influenced by the provision of at least one additional layer. For example, the material used for the at least one additional layer can have a higher thermal conductivity compared to the material used for the at least one functional layer. In this way, the thermal conductivity of the electrical strip can be improved, which enables operation at higher thermal loads compared to an electrical sheet without at least one additional layer.

Furthermore, the bonding according to the invention by means of adhesion bonding with atomic diffusion allows a reduction of the thickness of the magnetically effective functional layers of the electrical strip. Due to the quadratic dependence of the eddy current loss factor on the thickness d of the individual functional layers of the electrical strip, this is particularly advantageous for achieving lower core losses.

It was recognised that by means of such an electrical strip with at least one functional layer with a thickness in the range of 2 to 100 μm, preferably 2 to 60 μm, the core losses can be significantly reduced. In particular, a significant reduction of the eddy current losses is achieved by the said thicknesses of the functional layers: the eddy current loss factor $k_{vortex} = \square *d^2/(6*\rho)$ is quadratically dependent on the thickness of the individual functional layer d. By providing at least one functional layer partly, preferably completely, consisting of a magnetisable material with the said thicknesses and at least one additional layer of non-magnetisable material, the thickness of the respective functional layers of the electrical strip contributing to the eddy current losses is reduced. However, the total thickness of the functional layers can then essentially correspond to conventional electrical sheets. Thus, the electrical sheets described can have the same magnetic effect as an inductive component as conventional electrical strips, but have lower energy losses. This is because the eddy current loss factor and thus the eddy current loss can be significantly reduced. This enables particularly efficient energy conversion.

Furthermore, it was recognised that by providing at least one functional layer with the aforementioned thicknesses, the coercive field strengths in particular can also be influenced and hysteresis losses can be reduced. In particular, the provision of at least one functional layer with the aforementioned low thicknesses enables a separation of the magnetically effective layers for a fixed overall thickness of the electrical strip, so that the propagation of eddy currents can be spatially limited.

The at least one additional layer and the at least one functional layer are bonded together by an adhesive bond with atomic diffusion. In this way, an electrical strip can be provided which combines the advantages attributable to the bond by an adhesive bond with atomic diffusion and to the said low thicknesses of the at least one functional layer. This advantageously leads to a particularly significant reduction of the core losses. In particular, improved material properties in addition to the magnetic properties can also be achieved by the described composite. For example, a reduction in internal stresses and increased adhesive strength between the individual layers are achieved by the adhesive bond.

In a further embodiment of the electrical strip, the at least one additional layer has a thickness in a range from 2 μm to 100 μm, preferably in a range from 2 to 60 μm. By introducing at least one, preferably several, additional layers of such a small thickness, the material properties of the composite material can be specifically influenced. In particular, the provision of the described at least one additional layer or several additional layers allows the diffusion of the material of the functional layers through an additional layer. For example, if the additional layer has an electrically insulating material, diffusion of the material of the functional layers through an additional layer can eliminate the electrical insulation of the functional layers from each other. The heat conduction between the layers can also be improved by this diffusion.

When designing the functional layers and additional layers, the aim is for them to form continuous layers. However, the magnetic properties can also be improved by means of at least one additional layer not formed as a continuous layer, or several such additional layers, and in particular the magnetic reversal losses, especially the hysteresis and eddy current losses, can be reduced compared to conventional electrical strips. Furthermore, it may be possible to achieve that the functional layers are in contact with each other, for example electrical contact. This can further positively influence the electromagnetic properties of the electrical strip, especially with specific geometries of the components made from it, particularly in applications of the electrical strip where a composite material with variable thicknesses and good electrical conductivity is required.

According to a further embodiment of the electrical strip, the at least one additional layer consists at least partially, preferably completely, of a metallic material. By using a metallic but non-magnetisable material for the material of the at least one additional layer, a particularly adhesive metallic adhesion bond with atomic diffusion can be achieved. This leads to an increased resistance of the electrical strip and thus to a longer life span of the same. Overall, a particularly resource-saving electrical strip is thus specified. Since metals predominantly have good electrical conductivity as well as good thermal conductivity, the electrical conductivity and/or thermal conductivity of the electrical strip can also be increased in this way, depending on the metallic materials used.

In a further embodiment, the at least one additional layer has copper (Cu), preferably a copper content with a mass fraction in the range of 1 to 15%. Copper is characterised by its high thermal conductivity, so that in this way an electrical strip with improved thermal conductivity is specified.

In a further embodiment of the electrical strip, the at least one additional layer has aluminium (Al), preferably an aluminium content with a mass fraction in the range from 1 to 15%, in particular in the range from 3 to 15%. Aluminium also has a high thermal conductivity, so that in this way an electrical strip with improved thermal conductivity is also specified.

An electrical strip with improved thermal conductivity allows for improved dissipation of heat, for example the heat generated by the induction-based eddy currents. Overall, the heat generated by the electrical strip due to the re-magnetisation losses can thus be dissipated more efficiently. Also, heat can be better distributed within the electrical component in which electrical strip is used as the electrical sheet. Since heat losses increase with increasing speed of an electrical machine and increasing frequency, the electrical strip or the electrical sheet made from it can be used particularly advantageously for applications that require a high frequency and speed.

Furthermore, the provision of at least one additional layer with a proportion of aluminium is advantageous, as aluminium has a low material density compared to other metallic materials. Thus, the provision of at least one additional layer with a proportion of aluminium results in a weight reduction of the electrical strip. A reduction in weight allows greater flexibility in the application of the electrical strip or electrical sheet in electrical and electronic components. This is particularly advantageous for the use of electrical strips in moving electrical or electronic elements, as energy for moving these elements can thus be saved.

In another embodiment of the electrical strip, the at least one additional layer comprises zirconium (Zr). Zirconium is characterised not only by high thermal conductivity but also by good corrosion resistance. In this way, both the durability and the thermal conductivity of the electrical strip can be increased. Furthermore, the fact that zirconium is relatively soft and flexible makes it easier and more efficient to process the at least one additional layer and/or the electrical strip, for example by rolling, forging and hammering.

Furthermore, the at least one additional layer may have a specific thermal conductivity at least equal to, preferably greater than, the specific thermal conductivity of the at least one functional layer. In this way, an overall improved thermal conductivity of the electrical strip is achieved and the previously described advantages result.

In a further embodiment, the at least one additional layer consists at least partially, preferably completely, of an austenitic alloy or an austenitic steel, referred to as austenite for short. By providing at least one additional layer of austenite, a reduction of the magnetic reversal losses, in particular the hysteresis and eddy current losses, can be achieved. By providing at least one additional layer of this paramagnetic material, two functional layers of an electrical strip, between which the additional layer is arranged, can be magnetically separated from each other, i.e. isolated. This leads in particular to a reduction of the eddy currents caused by electromagnetic induction.

Furthermore, the provision of at least one additional layer of austenite is advantageous, as austenite has advantageous mechanical properties, for example a high formability, and is thus easy to process. This simplifies the production of an electrical strip and offers increased flexibility for applications. Austenitic steels or alloys also have a high resistance to aggressive environmental conditions, especially to corrosion attacks. Thus, the resistance of an electrical strip can be increased and the life span extended.

In particular, it has proved advantageous to provide at least one additional layer of austenite which has been subjected to a heat treatment at a temperature in the range from 650 to 1000° C., preferably from 670° ° C. or from 1000° C.

In a further embodiment, the at least one additional layer consists at least partially, preferably completely, of Damascus steel, also called damasc steel. The use of damask steel allows the combination of different steels with different advantages in one material. For example, the at least one additional layer can thus be made of a material that is both flexible and has cutting properties. This is advantageous for the processing and also later application of the electrical strip.

Furthermore, the at least one additional layer can consist at least partially, preferably completely, of a non-metallic material, preferably a carbon (C)-containing material, particularly preferably graphene or graphite. Non-metallic materials generally have very low to negligible electrical conductivity, so that such materials are well suited as at least one additional layer for insulating the at least one functional layer. The use of non-metallic materials can also have a positive effect on other material properties of the electrical strip.

Due to the high thermal conductivity inherent in graphene or graphite, according to one embodiment, an electrical strip with improved thermal conductivity is provided, so that the heat generated in the electrical strip, for example by loss processes, can be dissipated more quickly. In addition, graphene or graphite is a very flexible, pliable, transparent and extremely tensile material, so that the mechanical properties and in particular the processability of the composite material comprising at least one functional layer and at least one additional layer are improved.

In another embodiment, at least two functional layers have different ferromagnetic materials and/or at least two additional layers have different non-magnetisable materials. In this way, it is possible to provide an electrical strip that has a high flexibility of combination of different materials and thus improved optimisation possibilities with regard to different applications. For example, it is possible to provide higher proportions of certain alloying elements in the outer layers of the electrical strip, which contribute to improved corrosion resistance of the outer layers, for example.

Furthermore, it is preferred that the material properties vary in the at least one functional layer and/or in the at least one additional layer. Thus, different ferromagnetic properties or different electrical or thermal conductivities can be set and achieved in the surface of the layers. For this purpose, different materials are arranged in sections in one of the layers before bonding, which are bonded to each other after bonding, in particular after plating. Thus, for example, for a particular electric motor design, a stator can be produced in which a high thermal conductivity with at least one additional layer containing copper is provided inside the motor to dissipate the thermal energy produced and at least one additional layer containing aluminium is provided outside the motor to reduce weight.

It is also possible to vary the proportions of alloying elements with different diffusion properties in the layers, for example in different additional layers and/or in different functional layers. In the case of heat input from the outside, which gradually weakens into the interior of the material, it is thus possible to achieve uniform thermal diffusion over the entire thickness of the electrical strip. Alloying elements acting as diffusion barriers can also be introduced into individual layers. In this way, the electrical properties can be specifically influenced in different areas of the electrical strip, especially during the production of the electrical strip.

Preferably, different areas of the three-dimensional structure of the electrical strip have different material properties, in particular different magnetic properties. This enables the production of a pattern of electrically conductive and/or magnetically connected areas within an electrical strip. Furthermore, the introduction of alloying elements to specifically influence the microstructure, for example to bind impurities at grain boundaries, is possible. In this way, purer materials, in particular purer functional layers, can further reduce the electromagnetic losses of the electrical strip. In particular, by providing anisotropic microstructures, different material properties can be achieved in a direction parallel to the layer plane and in a plane orthogonal to the layer plane.

Furthermore, when using several functional layers, it is possible that at least two functional layers or several functional layers have different thicknesses. Likewise, when using several additional layers, these several additional layers can have different thicknesses. In this way, an electrical strip with a high geometric flexibility is specified for targeted adaptation to the installation space available in the respective application. Thus, a particularly fine adjustment of optimised material properties of the electrical strip is possible.

According to a further preferred embodiment for solving the above-mentioned object, an arrangement of electrical strips, in particular of electrical sheets, is given, wherein at least two electrical strips are arranged in a stack and wherein a separating layer, in particular a lacquer layer, is provided between at least two electrical strips and wherein the electrical strips are formed according to one of the preceding embodiments.

Such an arrangement or stack is also called a lamination stack and can be used, for example, as part of stators and/or rotors of an electric motor. Due to the improved properties, in particular with regard to the re-magnetisation losses, of the individual electrical strips, the power transmission can be improved by means of the lamella stack when conducting and amplifying magnetic fields. The separating layer serves to insulate the individual electrical strips from each other and also optimises the efficiency of the lamination stack by reducing the core magnetisation losses.

According to a further teaching, the object described above is also solved by using an electrical strip, in particular an electrical sheet, as an iron core, wherein the electrical strip is formed according to one of the examples and variants explained above. In particular, the electrical sheet is used as the iron core of an electromagnet, in particular in a transformer or in an electric motor or for relays, switches, contactors, choke coils, ignition coils, current meters and controllable deflection magnets.

An iron core, also called a magnetic core, is understood to be a component from which, together with electrical conductors and mechanical parts, an electrical or electronic component, also called an inductor, can be manufactured. Iron cores made of electrical sheets are characterised above all by scalable sizes and are used in a wide range of applications, from small mains transformers the size of a matchbox to transformers and electric motors to power station generators.

The use of an electrical strip according to one of the previously explained examples and variants as an iron core enables great flexibility with regard to the size of the electrical or electronic component while at the same time optimising the energy conversion. In particular, by using at least one functional layer with the aforementioned low thicknesses, the thickness of the electrical strip can be flexibly designed and, in particular, reduced. Furthermore, it was recognised that by using an electrical strip according to one of the previously explained examples and variants as an iron core, the core losses, in particular the hysteresis and eddy current losses, of the iron core can be reduced. By constructing the electrical strip as a composite material comprising the at least one functional layer described above and the at least one additional layer described above, the eddy currents caused by electromagnetic induction are spatially limited to the at least one functional layer, so that eddy current losses can be reduced.

It is also particularly advantageous to use several electrical strips, which can be arranged one above the other in a stack, for example, as an iron core. The several electrical strips of the stack can be glued together or otherwise connected by means of a release layer, in particular a lacquer layer.

By means of an electrical strip characterised by the above-described bond by adhesion formation with atomic diffusion, those material properties can be specifically influenced which have a decisive influence on the design parameters of an iron core. For example, the weight of the iron core can be reduced by providing at least one additional layer with a lower material density than the at least one functional layer. Also, an electrical strip and thus an iron core with improved thermal conductivity can be realised by specific material selection of the at least one additional layer and by means of the described composite. This is particularly advantageous for high power densities, which can quickly lead to overheating of the iron core. Thus, the use of the described electrical strip also enables operation of the electrical or electronic component at higher temperatures. Overall, the energy conversion can thus be made more efficient with the help of the use of the described electrical strip as an iron core.

It is advantageous to use the described electrical strip as an iron core, as a magnetic core for low-frequency (mains frequency up to a few kHz) applications and large and very large powers up into the megawatt range. In particular, an electrical strip described above can be used advantageously as an iron core for stators or in transformers and generally for electrical machines. Other properties of an iron core, such as tensile strength, can also be influenced by a suitable choice of materials.

According to the invention, the above object is also solved by a method for producing an electrical strip, in which at least one functional layer is provided, wherein the at least one functional layer at least partially, preferably completely, consisting of a ferromagnetic material, in which at least one additional layer is provided, wherein the at least one additional layer at least partially, preferably completely, consisting of a non-magnetisable material, in which the at least one functional layer and the at least one additional layer are arranged adjacent to one another, and in which an adhesive bond with atomic diffusion is created between the at least one functional layer and the at least one additional layer by applying pressure.

The method enables an individual composite structure of layers of different materials as well as a variation of the layer thicknesses of the individual layers with high adhesion of the layers to each other. In particular, the at least one functional layer and the at least one additional layer are bonded together to form a composite material. Overall, a targeted adaptation of the properties of the electrical strip to different types of applications is thus possible. In particular, the magnetic properties of the electrical strip can be positively influenced by the specific selection of materials for the layers and core losses, especially eddy current and hysteresis losses, can be reduced. Furthermore, by selecting materials with different thermal expansion, a so-called working of the layers among each other and the resulting loads can be positively influenced. For example, the total thermal expansion of the electrical strip can be reduced by balancing the thermal expansion of the layers among each other. This allows an optimised design of the component, for example the motor, in which the electrical strip is used as electrical sheet.

In the method, a material different from the material of the at least one additional layer is used for the at least one functional layer. Thus, a composite material is produced with properties that lie between the extreme values of the material-specific properties of the bonding partners. It is also possible to vary the layer thicknesses of the individual layers by means of the above-mentioned method, so that the desired properties of the electrical strip can be further influenced in a targeted manner.

Preferably, the at least one functional layer consists at least partially, preferably completely, of a ferromagnetic material, in particular of one of the above-mentioned ferromagnetic materials. Further preferably, the at least one additional layer consists at least partially, preferably completely, of a non-magnetisable material, in particular of one of the above-mentioned materials. Other combinations of materials, for example metallic materials or carbon-containing materials, in particular graphene, are also possible.

The method also enables the production of an electrical strip with several functional layers as well as several additional layers, whereby the functional layers and additional layers are preferably arranged in alternating order. For example, it is possible to produce a composite material with insulating additional layers. Preferably, an adhesive bond with atomic diffusion is created between one additional layer and one functional layer by applying pressure.

Alternatively, several functional layers or several additional layers can be arranged adjacent to each other, so that by using layers with a uniform layer thickness, the thickness of a layer consisting of similar layers can be varied by such an arrangement. For example, by arranging a plurality of functional layers one above the other, a functional layer with a variable thickness that is a multiple of the thickness of a single functional layer can be created. Also, by arranging several additional layers on top of each other, an insulating effect can be increased with respect to the functional layers adjacent to the additional layer.

In the above-mentioned method, the bonding partners, in this case the at least one functional layer and the at least one additional layer, are arranged adjacent to each other and brought into intimate contact, in particular approached to atomic distances. The superposition of the layers can be preceded by a cleaning process in which the surfaces coming into contact are freed from, for example, absorbed gases, oxide layers or impurities such as oil residues.

The cleaning process, and in particular the removal of the oxide layers, increases the bonding ability of the surfaces of the bonding partners. The oxide layers and generally the surface layers of the bonding partners can also be broken up or roughened by further processes, for example forming processes, to increase the surface reactivity. Other processes such as rolling or stretching are also used to solidify areas of the binding partners close to the surface and to create highly active surfaces.

By applying pressure, the surfaces to be bonded are brought into intimate contact with each other over a large area, whereby the pressure can also be applied in conjunction with other processes, for example a forming process. The bond is formed by the adhesive bond between the bonding partners through mixing by means of atomic diffusion, whereby a transition layer is formed over which a continuous adjustment of the material properties takes place. In addition, it is possible to introduce further energy in the form of heat, with which the atomic diffusion can be intensified. However, an adhesive bond with atomic diffusion can also be created without the additional introduction of heat. The introduction of pressure, for example by pressing the bond partners together, and the introduction of further energy, for example in the form of heat, can take place simultaneously or at different times.

The introduction of further energy can also influence the expansion of the transition layer, whereby this is generally dependent on the respective materials of the bonding partners. An enlargement of the expansion zone and an enhancement of the atomic diffusion can be used specifically to influence the material properties of the electrical strip. For example, increasing the expansion zone and enhancing atomic diffusion leads to greater mixing of the composite material, which can promote increased electrical conductivity and/or increased thermal conductivity and increased dimensional stability of the electrical strip.

In addition, the introduction of energy and heat can specifically influence the microstructure of the composite material. For example, recrystallisation of the materials, for example of the at least one functional layer and/or the at least one additional layer, can take place. The degree of consolidation of the materials, for example of the at least one functional layer and/or the at least one additional layer, can also be influenced.

The process described above can, for example, be understood as cladding, whereby in English usage the term "cladding" can be used predominantly to describe such a process. Predominantly, the process described above creates a metallic bond of two bonding partners at a time. An adhesive bond with atomic diffusion of metallic materials with non-metallic materials, for example carbon-containing materials, or between non-metallic materials can also be created.

According to a preferred embodiment of the method, at least one of the at least one functional layer and/or at least one of the at least one additional layer are heat treated. Heat treatment can specifically influence material properties, in particular the microstructure. Individual or several layers can be heat-treated separately before joining or several layers can be heat-treated together during or after joining.

The heat treatment of individual layers before joining offers the possibility of specifically influencing the material properties of only some of the multiple layers of an electrical strip, for example the externally arranged layers. Thus, the microstructure and the resulting electromagnetic properties of individual layers can be specifically changed. For example, heat treatment can lead to increased grain growth or the formation of precipitates of individual elements, especially alloying elements.

Heat treatment of several layers during joining can increase the atomic diffusion between the layers and thus increase the adhesive strength of the layers to be joined. By means of a heat treatment after joining, a further adjustment of the material properties, in particular of the microstructure, can take place, and the adhesive strength can also be further increased in this way.

In a further preferred embodiment of the method, the at least one functional layer and the at least one additional layer are joined together by means of cold roll cladding. In this way, it is possible to separate forming and diffusion processes during the production of an electrical strip. Also, a composite by cold roll cladding can be further processed like a homogeneous material by cold rolling.

In the cold roll cladding process, the bonding partners, for example the at least one functional layer and the at least one additional layer, can first be pretreated. Here, the materials to be clad are degreased and activated close to the cladding process, typically by matting with steel wire brushes. For some materials, activation may not be necessary. In the next step, the layers to be joined are cold-rolled together, whereby a significant reduction in thickness combined with a considerable elongation of the material combination can be achieved.

Before and/or during the performance of cold roll cladding, it can be advantageous if at least one of the layers is heated, whereby a temperature of 50 to 500° C. is preferred. Preheating can also be carried out by indirect material heating by means of heating the equipment in which the cold roll cladding is carried out. Preheating does not correspond to hot roll cladding, since temperatures in the range of the melting point are selected here.

The temperature of the preheating leads to an improved reactivity of the surfaces of the layers, so that the layers bond better together. The temperatures that subsequently arise during cold rolling due to stretching of the material and breaking of the surfaces are then in the range of up to 400° C., for example. During cold rolling, additional heating at temperatures below the recrystallisation temperature of the rolled material can also be provided.

By applying high pressure during rolling, new highly active surfaces can be created between the layers to be joined under exclusion of air and these can be brought into intimate contact with each other. Adhesive forces, mechanical interlocking and bonds that are already beginning at certain points can achieve initial adhesion of the layers to be joined.

Directly after the cladding process, an adhesion annealing or diffusion annealing can take place, in which rearrangement processes at the atomic level are activated or reinforced by means of heat treatment and layers that are still incompletely adhered can be converted into a bond. For some material combinations, however, the adhesion generated during cladding is already sufficient, so that adhesion annealing can be dispensed with. In the case of heat treatment, the process parameters can be optimised to avoid or minimise any intermetallic layers that may occur. In addition, recrystallisation of the materials that may have been strongly strain-hardened by the cladding process can take place. Thus, the forming potential necessary for further processing of the material is restored.

In a further step, the composite material can be rolled to almost its final thickness. Further heat treatment may also be carried out to adjust the strength and microstructural properties of the electrical strip. In the case of very thin final dimensions, it may be necessary to carry out several rolling and/or annealing cycles due to a high overall deformation. On the other hand, especially with thicker final dimensions, it is also possible to plate directly to final thickness and dispense with a subsequent rolling process.

This can be followed by a skin pass, a finish rolling with a low degree of deformation, as well as a stretch bending process, in which the material composite can be deprived of any stretch limit elongation that may occur in the soft annealed state. By means of different roller roughnesses, specific surface finishes—from rough to bright or also isotropic or structured, e.g. by laser structuring (etching) of the surfaces or indirectly by laser structuring (etching) of the rollers used—can be set at the same time. The skin pass cut can also be dispensed with, especially if specific surface finishes are not important.

Furthermore, in particular as a final process step, a slitting can be provided in which the material is slit to final width and/or trimmed at the edges.

According to an alternative embodiment of the method, the at least one functional layer and the at least one additional layer are joined together by hot roll cladding. In hot roll cladding, the layers are joined during a hot rolling process at temperatures above the recrystallisation threshold. For this purpose, the layers to be bonded are typically joined together into a package before rolling and hot rolled out as a complete unit. The bond can be created simultaneously by diffusion processes, which require a certain temperature to be activated.

According to another alternative embodiment of the method, the at least one functional layer and the at least one additional layer are bonded together by means of explosive cladding. By manufacturing by means of explosive cladding, no thermal energy is introduced during the cladding process, whereby the formation of brittle intermetallic phases can be prevented.

Regardless of the respective embodiment of the method described above, the electrical strip is usually in the form of a strip after joining. The electrical strip in the form of a strip can be further processed, for example formed, cut to size and joined, after the method according to the invention has been carried out, in particular after plating. Due to the good adhesive properties, it is possible to form the electrical strip like a homogeneous material. Typically, the forming processes used are rolling, bending, deep drawing, stretch forming, hydroforming or roll forming.

Furthermore, mechanical separation, such as cutting or punching, can be provided. Thermal cutting processes and laser processing are also possible. Furthermore, chemical etching, wire erosion or water jet cutting can be used. These processes advantageously do not or only insignificantly increase the k-form factor in the calculation of the core losses. The provision of additional layers, in particular comprising non-magnetisable materials, preferably aluminium-containing materials, can also offer advantages with regard to material properties influenced by the separation process. For example, the provision of additional layers comprising corrosion-resistant materials, such as materials containing aluminium or other reactive alloying elements, can delay corrosion, particularly at the cut edges of an electrical sheet.

Individual electrical strips can be joined to form a package, this is generally referred to as packaging. A package consisting at least partially, preferably completely, of at least one electrical strip according to the invention permits almost unchanged further processing in known standardised processes, so that an adaptation of the further process steps possibly following the method according to the invention is unnecessary.

A single-stage process known as punch-packing, in which the electrical strip is punched out, placed on a stack and joined to the stack, can also be provided.

BRIEF DESCRIPTION OF THE DRAWINGS

Further features and advantages of the invention will be apparent from the following description of examples of embodiments, reference being made to the accompanying drawing.

In the drawing show

DESCRIPTION OF THE INVENTION

In the following description of the various embodiments according to the invention, components and elements with the same function and the same mode of operation are given the same reference signs, even if the components and elements may differ in dimension or shape in the various embodiments.

The embodiments relate to electrical sheets, which are described as examples of electrical strips.

FIG. 1a to FIG. 1d first show various embodiments of an electric sheet 2 according to the invention.

Figure 1A:
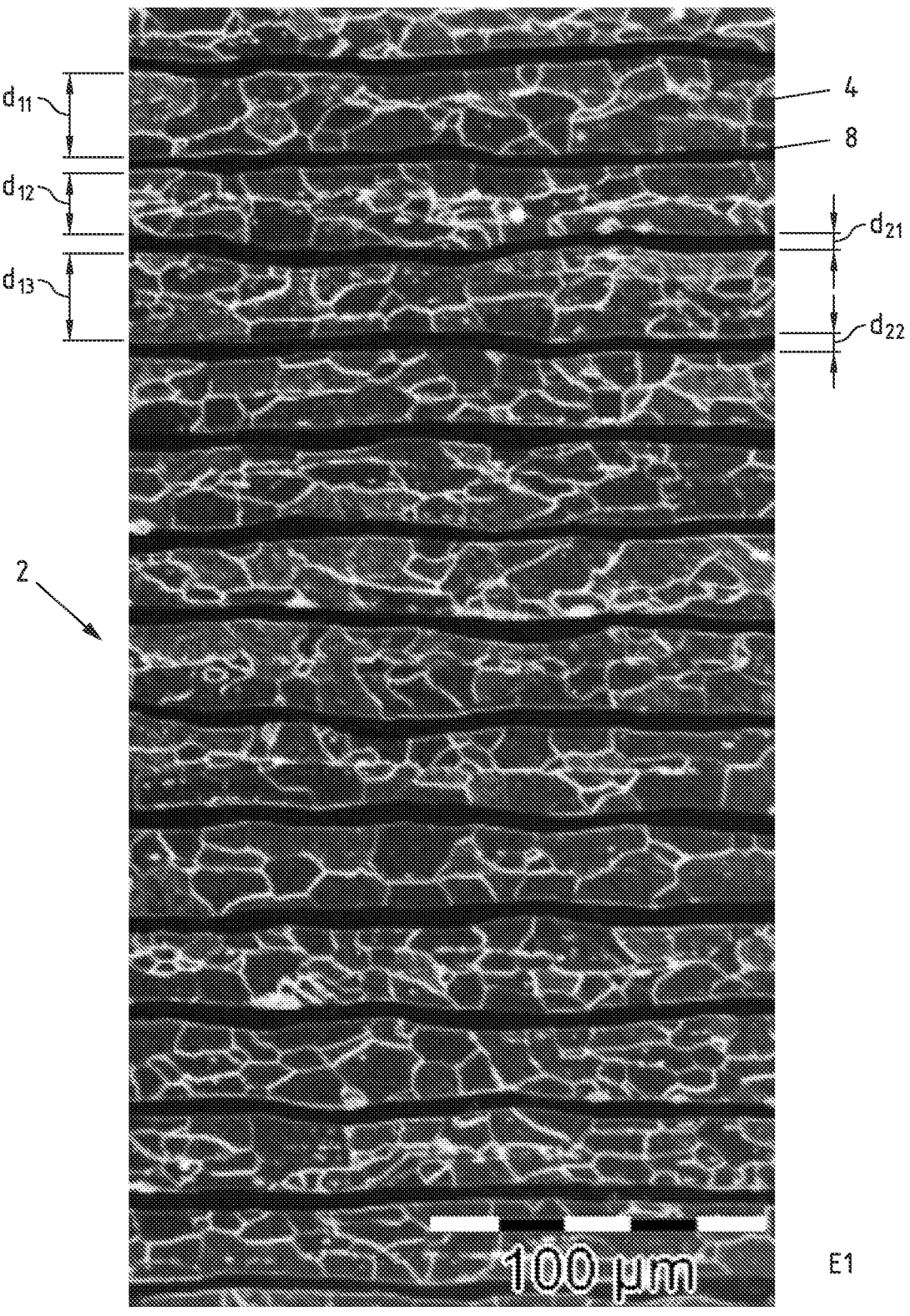
FIG. 1a-d Various embodiments of an electrical strip according to the invention in the form of an electrical sheet, FIG. 2a-b Steps of an embodiment example of the method according to the invention for manufacturing an electrical strip in the form of an electrical sheet in schematic representation, FIG. 3a-b Results of tests on various electrical strips in the form of electrical sheets and FIG. 4a-b Hysteresis measurements on various electrical strips in the form of electrical sheets.

FIG. 1a shows, in the form of a section of a micrograph, a structure of an electrical sheet 2 having several functional layers 4 made of a ferromagnetic material and additional layers 8 arranged one above the other, the functional layers 4 and the additional layers 8 each being arranged in alternating sequence.

The functional layers 4 are made of ferromagnetic hot-rolled steel of grade DD11 (1.0332). The grain structure of the ferromagnetic material of the functional layers 4 is characterised by grain sizes of less than 100 μm, with many of the grain sizes being in the range of 20 to 50 μm.

In this example, the additional layers 8 are designed as continuous layers and separate the functional layers 4 from each other. The non-magnetisable material of the additional layers 8 is copper (Cu).

An electric sheet 2 with functional layers 4 of approximately constant thickness (layer thickness) $d_{1i}$ is shown, where i indicates the respective functional layer 4 and runs from 1 to n, with n the total number of functional layers 4 present. Here, $d_{11}=d_{12}=d_{13}= \ldots =d_{1n}$, the thicknesses are approximately constant, but vary over the width of the representation due to the manufacturing process.

Alternatively, the functional layers 4 can be formed with thicknesses $d_{1i}$, for which applies $d_{11} \neq d_{12} \neq d_{13} \neq \ldots + d_{1n}$, which thus have different thicknesses $d_{1i}$. Also, only some of the functional layers 4 can have different thicknesses $d_{1i}$ and other functional layers 4 can have approximately constant thicknesses $d_{1i}$. The same applies to the thicknesses $d_{2i}$ of the additional layers 8.

As can be seen from the scale in FIG. 1a, layer thicknesses $d_{1i}$ and $d_{2i}$ of significantly less than 100 μm, in particular less than 60 μm, are achieved throughout.

Figure 1B:
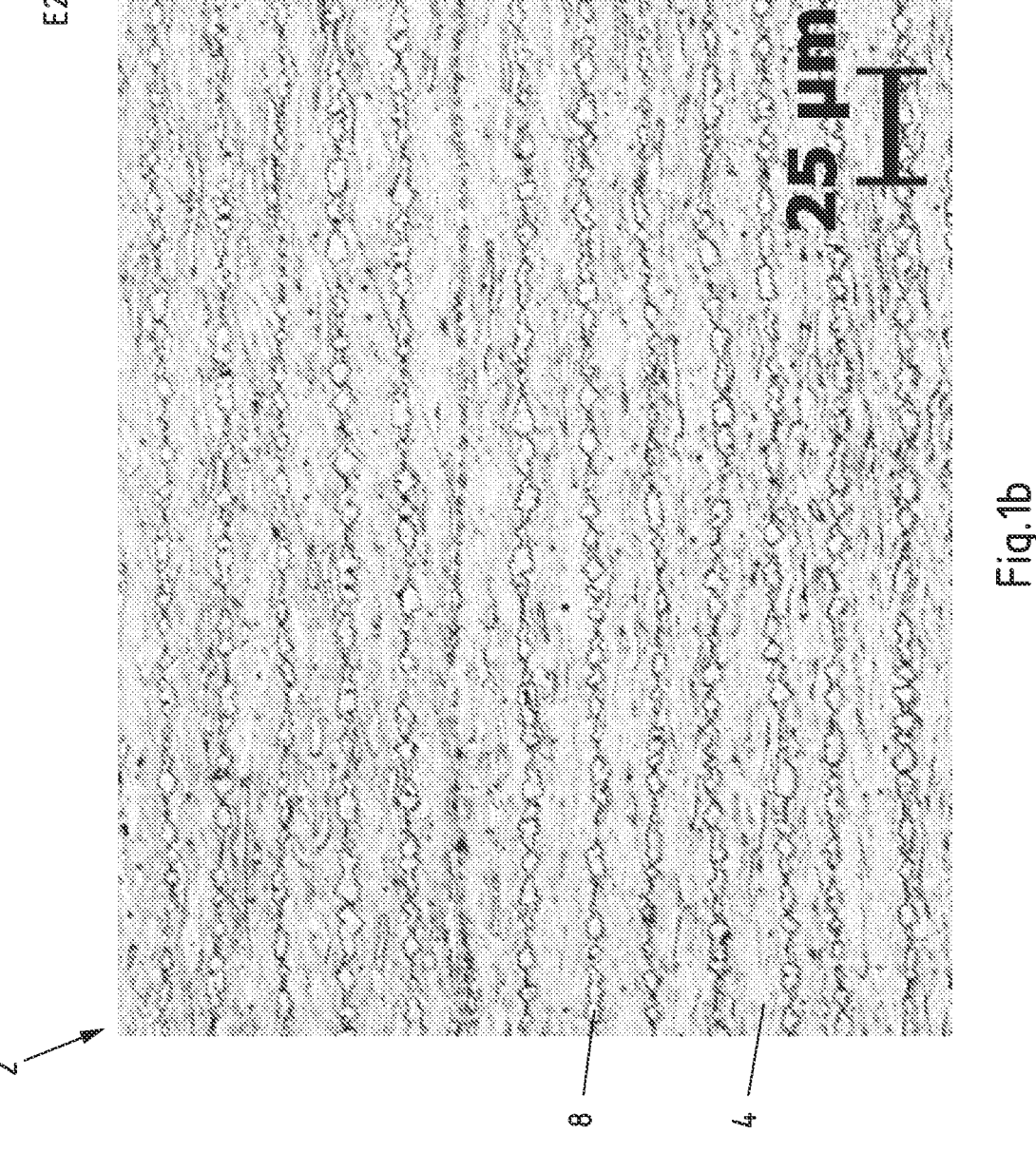

FIG. 1b also shows, by means of a section of a micrograph, a structure of an electrical sheet 2 also having several functional layers 4 and additional layers 8 arranged one above the other, the functional layers 4 and the additional layers 8 each being arranged in alternating sequence. The functional layers 4 again consist of the steel DD11. In this example, the additional layers 8 are formed as non-continuous layers, so that contact between the functional layers 4 is possible. In particular, an irregular shape of the additional layers 8 and the functional layers 4 is clearly visible in this example. Here the additional layers 8 have the non-magnetisable material aluminium (Al). The structure of the ferromagnetic material is particularly fine-grained, the thickness of the functional layers 4 is less than 25 μm and the additional layers have a thickness of a few μm.

Figure 1C:
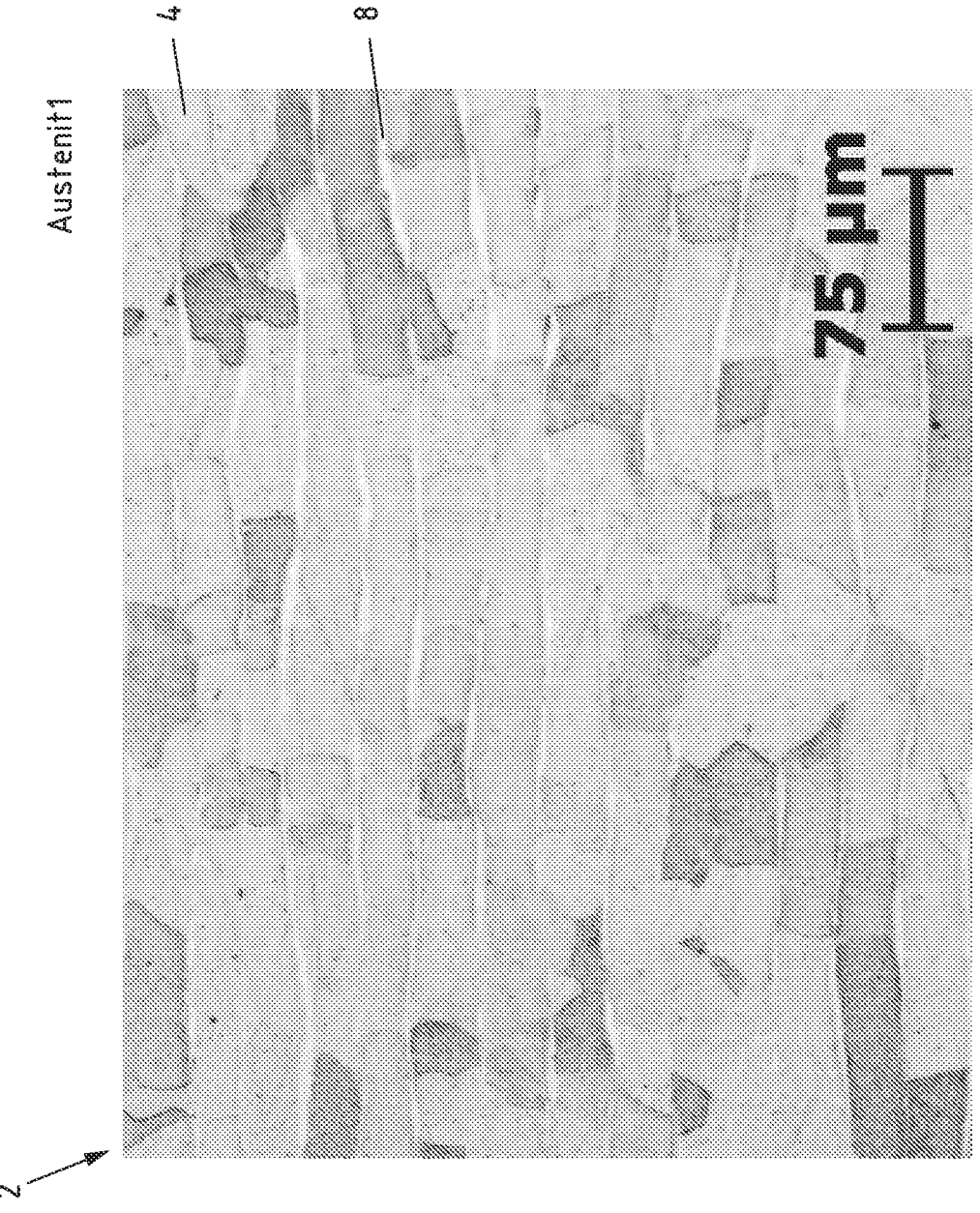
Figure 1D:
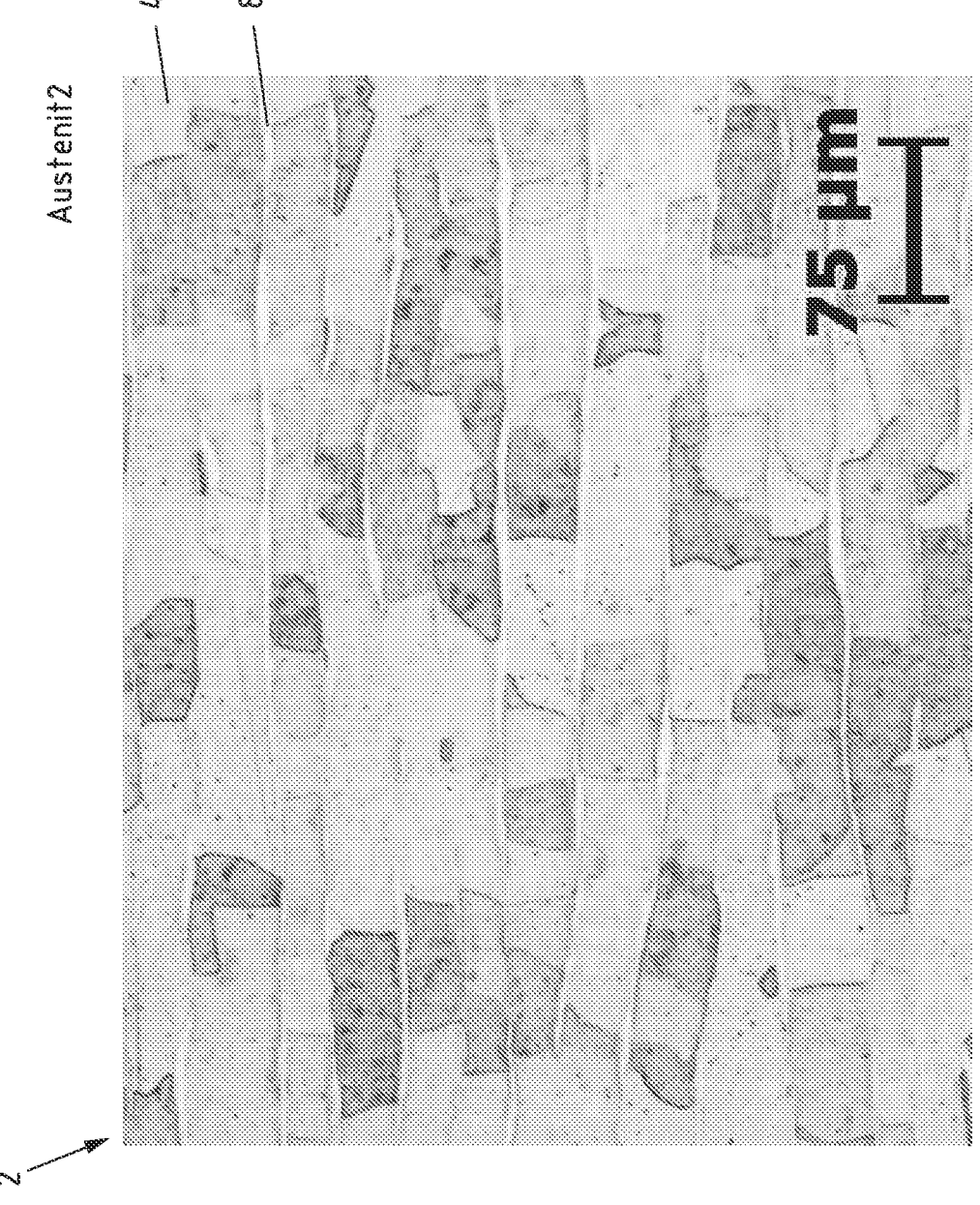

FIGS. 1c and 1d also show, in the form of a section of a micrograph, the structure of electrical sheets 2 having several functional layers 4 and additional layers 8 arranged one above the other, the functional layers 4 and the additional layers 8 each being arranged in alternating sequence. The functional layers 4 again consist of the steel DD11. In this example, the additional layers 8 are designed as particularly thin and partially discontinuous layers, so that contact between the functional layers 4 is also possible here at some points. The presence of an inhomogeneous material of the functional layers 4 is also clearly visible here, whereby the different shades of grey in individual functional layers 4 indicate a varying composition of the ferromagnetic material.

The thickness of the functional layers 4 is less than 75 μm on average. In the examples shown in FIGS. 1c and 1d, the non-magnetisable material of the additional layers 8 is austenitic steel. It is also possible that the additional layers 8 appear as discontinuous layers on the micrograph due to their very small thickness of less than 10 μm and below at the selected resolution, but they still allow intact isolation of the functional layers 4 from each other.

The functional layers 4 and additional layers 8 of the embodiments of an electric sheet 2 shown in FIG. 1a-d are bonded to each other by an adhesive bond with atomic diffusion. In particular, FIG. 1b shows an interdiffusion of the different materials of the functional and additional layers 4, 8 with each other on a microscopic level.

Figure 2A:
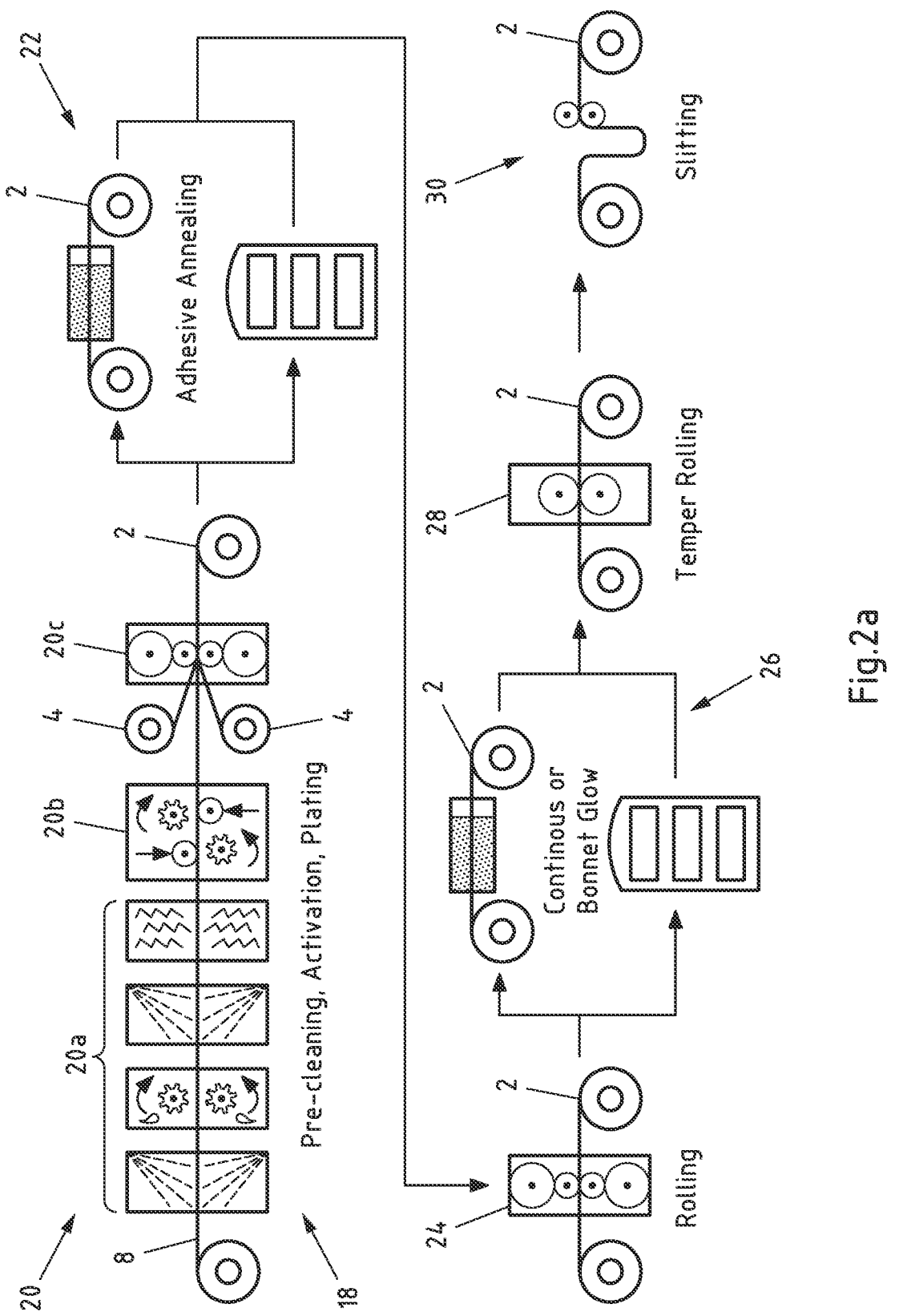
Figure 2B:
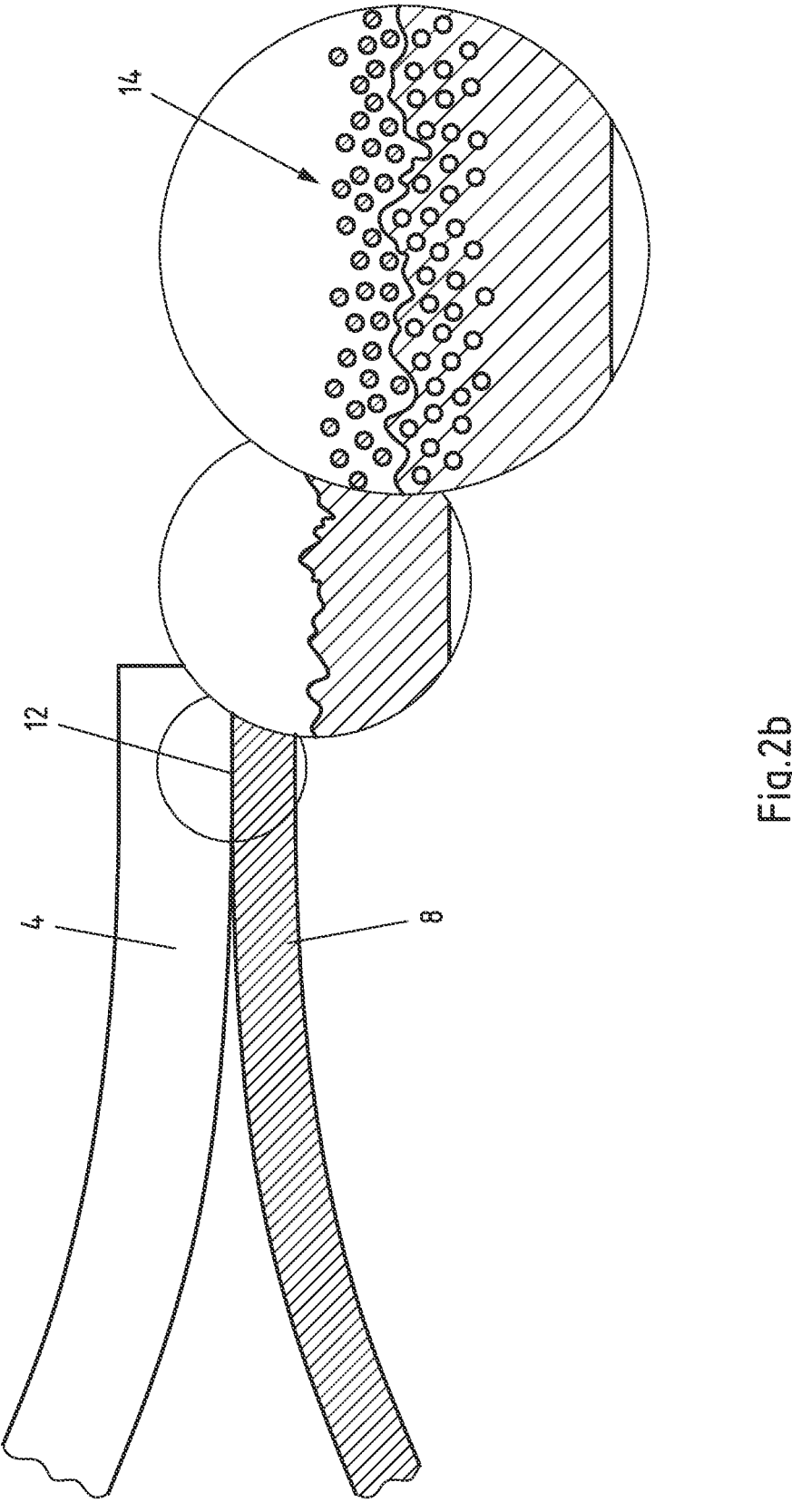

In FIGS. 2a and 2b, steps of an embodiment example of the method according to the invention for manufacturing an electrical sheet 2 are shown in schematic representation.

FIG. 2a first shows the process sequence with a cold-roll plating device 18, in which an electrical strip 2 to be produced is manufactured by various process steps. This can be, for example, an electrical sheet 2 according to the embodiments shown in FIG. 1a-d.

In a first method step 20, the bonding partners are first pretreated; the pretreatment of the material of the additional layer 8 is shown here. In this first method step 20, a pre-cleaning 20a is carried out, including a degreasing of the surfaces, as well as an activation 20b, in which the surfaces are mechanically torn open. In the example shown, the material fed from above and below and used for the functional layers 4 is not activated. However, this can be provided additionally, depending on the material selected for the functional layers 4.

Furthermore, the layers 4, 8 to be joined are cold-rolled together, whereby a significant reduction in thickness is achieved. The joining of an additional layer 8 of the material with two functional layers 4 of the material is shown here. The rolls shown in 20c exert a pressure on the layers 4, 8 to be joined, which brings the layers 4, 8 into intimate contact with each other at the atomic level.

It is also possible that the pre-treatment steps shown in method step 20, pre-cleaning and activation, are carried out additionally or only for the material of the functional layers 4, and the material of the additional layers 8, depending on the material selected, is not pretreated before the layers 4, 8 are joined. Thus, a method can also be provided in which, for the method step 20 shown in FIG. 2a, the material of the functional layers 4 takes the place of the material of the additional layers 8 and the pre-treatment is carried out on a functional layer 4 of the material before bonding with additional layers 8 of the material.

FIG. 2b shows an enlarged section of the formation of an electrical strip 2 by adhesive bonding 12 with atomic diffusion 14. This adhesive bonding 12 of the materials of the respective functional layer 4 and additional layer 8 to be joined is already initiated in the first method step 20. For some material combinations, this adhesive bond 12 is already sufficient for an electrical strip 2.

According to FIG. 2a, a further method step 22 involves adhesion annealing, also known as diffusion annealing, in which further rearrangement processes 14 are activated or reinforced at the atomic level by means of heat treatment and layers 4, 8 that are still incompletely adhering can be converted into a bond. For some material combinations, however, the adhesion generated during plating is already sufficient, so that adhesion annealing can be dispensed with. This is because a diffusion bond is already generated during cladding, regardless of whether cold or hot rolling was used, After the adhesion annealing, a further rolling of the electrical strip 2 takes place in a next step 24, during which it is rolled almost to final thickness. In addition, a further heat treatment, also called bell annealing, to adjust the strength and structural properties of the electrical sheet 2 can take place in a subsequent step 26. The method steps 24 and 26 can be carried out several times, especially for very thin final dimensions. However, a single rolling/annealing cycle 24, 26 may also be sufficient, especially for thicker final dimensions.

FIG. 2a shows a further method step 28, skin-pass rolling, which denotes finish rolling with a low degree of deformation, in which any stretching of the yield point that may occur in the soft-annealed state can be removed from the composite material 32. In this step 28, targeted surface finishes of the electrical sheet 2 can be set simultaneously by rolling with different roll roughnesses. The last method step 30 shown here is slitting, in which the composite material 32 is slit to its final width.

FIGS. 3a and 3b show results of tests in the form of tables on various electrical sheets, wherein embodiments of an electrical sheet 2 according to the invention are compared with reference sheets from the prior art, wherein the reference sheets R1 and R2 are made of the steel DD11. The reference sheet R1 is heat-treated at approx. 670° C. after production and the reference sheet R2 is heat-treated at approx. 1000° C. after production.

In the table in FIG. 3a, the material parameters electrical conductivity K, material density p and the respective composition of the electrical sheets, from which the material parameters are calculated as an arithmetic mean over the individual layers, are first given for the embodiments of electrical sheets E1, E2, austenite1 and austenite2 according to the invention and for the reference R1.

While the reference consists of a single functional layer with a sheet thickness of 0.5 mm, the electrical sheets E1, E2, Austenit1 and Austenit2 each consist of 16 layers: eight additional layers each 10 μm thick and eight functional layers each 53 μm thick. The electrical sheet designated E1 has a structure and composition as shown in FIG. 1a, the electrical sheets E2, Austenit1 and Austenit2 correspond to FIGS. 1b, 1c and 1d respectively.

All listed electrical sheets have a total thickness or sheet thickness of 0.5 mm, as indicated in column 5.

The functional layers are made of DD11 steel—as described—to ensure comparability with references R1 and R2.

Furthermore, the table in FIG. 3a serves to illustrate the reduced eddy current losses by means of the embodiments of an electrical sheet 2 according to the invention. In column 6 of the table in FIG. 3a, the eddy current loss factor $k_{eddie}=$ ⏹ $*d^2/(6*\rho)$ calculated for the respective electrical sheets 2 is indicated, which according to $P_{eddie}=K_{eddie} (B_{max}f\pi)^2$ indicates the material-specific eddy current loss. In particular, by column 7 of the table, which indicates the reduction in eddy current loss of the electrical sheets E1, E2, austenite1 and austenite 2 achieved compared to the reference R1, it is clear that these latter electrical sheets can reduce eddy current losses significantly, by 90% on average. This reduction can be attributed in particular to the low thickness of the individual functional layers of less than 60 μm each.

The table in FIG. 3b compares the hysteresis losses achieved with embodiments of an electrical sheet according to the invention, E1, E2, austenite1 and austenite2, with the hysteresis losses achieved with electrical sheets made of the reference materials R1 and R2. The table compares the material-specific quantities material density p, the measured coercivity $H_c$ and the hysteresis loss measured at frequencies of 1 kHz and 10 kHz of the respective electrical sheets.

Columns 7 and 8 of the table show the reduction in hysteresis loss achieved by means of the electrical sheets E1, E2, Austenit1 and Austenit2 with respect to the reference R1 at a frequency of 1 kHz and with respect to the reference R2 at 10 kHz. For each of the electrical sheets E1, E2, Austenite1 and Austenite2 a reduction in hysteresis loss is obtained. At a frequency of 1 kHz a reduction of at least 14% up to 34% can be achieved, at a frequency of 10 kHz a reduction of 1% up to 43%.

To reduce the hysteresis losses, it is advantageous according to $P_{hyst}=(k_H 4 H_C B_{max} f)/\rho$ it is advantageous to reduce the coercivity $H_c$ and to increase the material density p. In the present experiments, it was found that by using an electrical sheet 2 according to the invention with layers connected by adhesive bonding 12 with atomic diffusion 14 and by providing the additional layers 8 according to the invention, the hysteresis losses can be reduced on the one hand by a reduced coercive field strength $H_c$, shown here for E2, austenite1 and austenite 2. In addition, even with an increased coercive field strength $H_c$, shown here at E1, compared to the reference value, the hysteresis loss can be significantly reduced, whereby this reduction is not solely due to the increase in the arithmetic mean of the material density $\rho$.

By means of an electrical sheet 2 according to the invention with functional layers 4 and additional layers 8 connected by adhesive bonding 12 with atomic diffusion 14 and by providing the additional layers 8 according to the invention for separating the individual functional layers 4 with a small thickness of the functional layers 4 according to the invention, an effect can also be achieved by which the hysteresis losses due to structural processes in the interior of the composite material are reduced. For example, the energy required for the changed alignment of internal elementary structures, the magnetic domains, is reduced. This effect can be seen as an increase in the increased material density that is effective in the electromagnetically relevant remagnetisation effects.

Figure 4A:
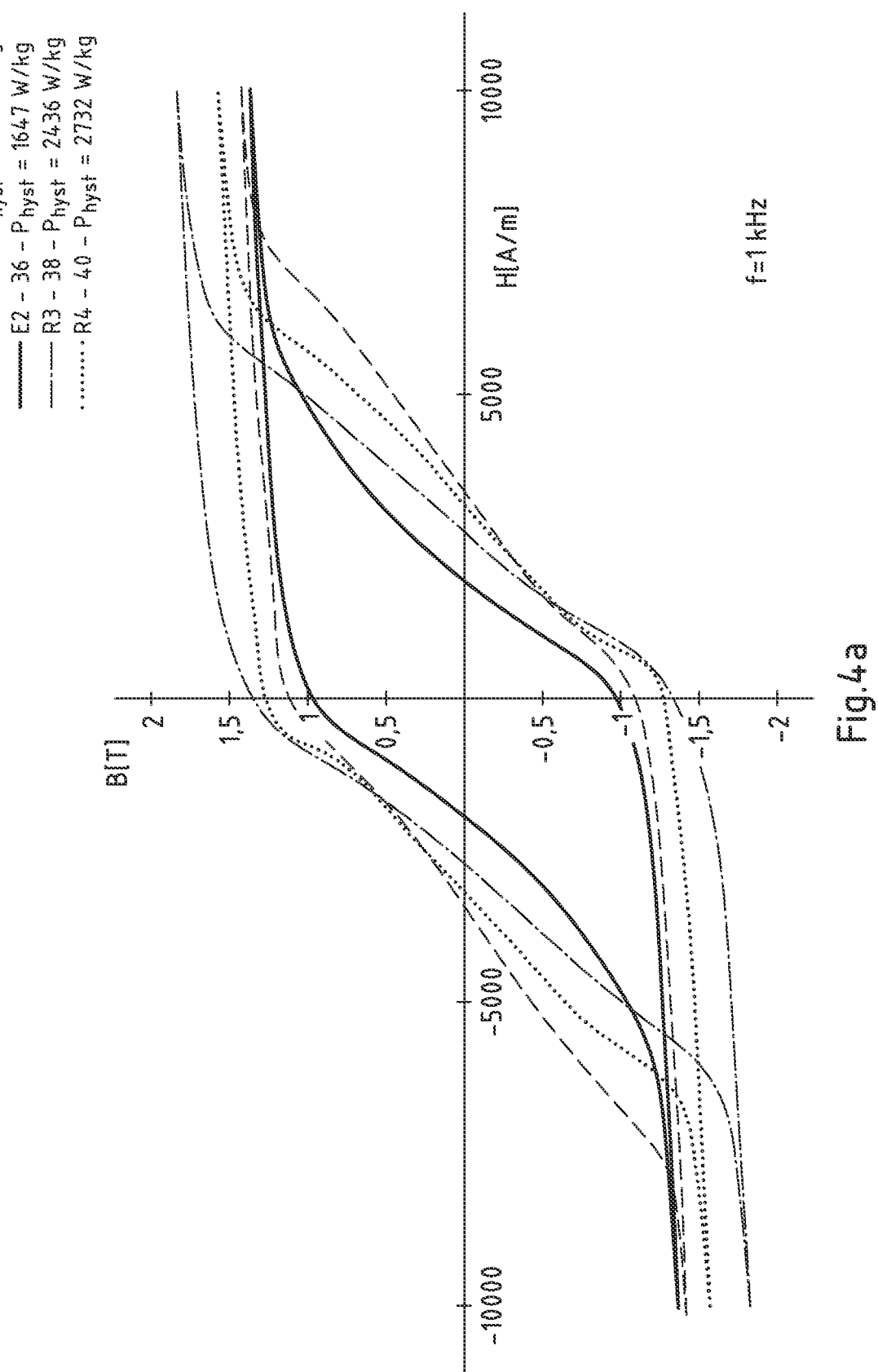
Figure 4B:
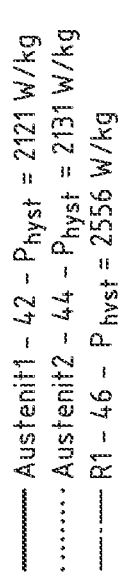

FIGS. 4a and 4b show hysteresis measurements on various electrical sheets, whereby FIG. 4a compares the hysteresis loops 34 and 36 measured with embodiments E1 and E2 of an electrical sheet 2 according to the invention as explained above with the hysteresis loops 38 and 40 measured for the single-layer reference sheets R3 and R4 made of steel DD11. The reference sheet R3 has been heat treated at approx. 600° C. and the reference sheet R4 is mill-hard and has not been heat treated. Both reference sheets also have a sheet thickness of 0.5 mm.

In FIG. 4b, the hysteresis loops 42 and 44 measured with austenite1 and austenite2 embodiments of an electrical sheet 2 according to the invention as explained above are compared with the hysteresis loop 46 measured for the reference sheet R1 explained above.

All hysteresis loops 34, 36, 38, 40, 42, 44 and 46 shown in FIGS. 4a and 4b were measured at a frequency of 1 kHz.

The hysteresis loss is proportional to the area of the respective hysteresis loop traversed, so that it can be seen from the figures that a lower hysteresis loss was measured in the respective graphs for the embodiments of an electrical sheet E1, E2, austenite1 and austenite2 according to the invention compared to the referenced electrical sheets R1, R3 and R4.

In particular, the hysteresis loss measured for E2 with a value of $P_{hyst}=1647$ W/kg can be significantly reduced compared to all other measured values. The measured hysteresis losses for E1 $P_{hyst}=2280$ W/kg, for austenite1 $P_{hyst}=2121$ W/kg and for austenite2 $P_{hyst}=2131$ W/kg are also below the measured values for the reference materials R1 $P_{hyst}=2556$ W/kg, R3 $P_{hyst}=2436$ W/kg and R4 $P_{hyst}=2732$ W/kg.

All the measurements shown make it clear that a reduction in both hysteresis and eddy current losses is achieved with electrical sheets 2 according to the embodiments of the invention described above. Overall, when using electrical sheets 2 according to the invention in electromagnetic components, the core losses are significantly reduced by targeted material selection of the materials of the functional layers 4 and additional layers 8 on the one hand, and by targeted material design on the other hand, in particular by reducing the thicknesses of the functional layers 4. This enables an optimised energy conversion of electromagnetic components and allows a more flexible design of the same, in particular through variably combinable layer thicknesses and variable material selection.

The absolute values of the hysteresis curves shown in FIGS. 4a and 4b are to be understood as examples. If a steel with different ferromagnetic properties is used for the reference materials and the functional layers of the electrical sheets according to the invention, other absolute magnetisation values may result, but the relative course of the hysteresis curves and the improvements explained occur in the same way with other steels.

The invention claimed is:

1. An electrical strip,
with at least one functional layer at least partially consisting of a ferromagnetic material and
with at least one additional layer at least partially consisting of a non-magnetisable material,
wherein the at least one additional layer and the at least one functional layer are connected to each other,
wherein at least one functional layer has a thickness in the range from 2 to 100 μm, preferably from 2 to 60 μm,
wherein
that the at least one additional layer and the at least one functional layer are bonded to one another by an adhesive bond with atomic diffusion.

2. The electrical strip according to claim 1,
wherein the at least one additional layer has a thickness in the range from 2 to 100 μm, preferably from 2 to 60 μm.

3. The electrical strip according to claim 1,
wherein the at least one additional layer consists at least partially, preferably completely, of a metallic material.

4. The electrical strip according to claim 1,
wherein the at least one additional layer has copper (Cu), preferably a copper content with a mass fraction in the range from 1 to 15%.

5. The electrical strip according to claim 1,
wherein the at least one additional layer has aluminium (Al), preferably an aluminium content with a mass fraction in the range from 1 to 15%, in particular in the range from 3 to 15%.

6. The electrical strip according to claim 1,
wherein the at least one additional layer has a specific thermal conductivity at least equal to, preferably greater than, the specific thermal conductivity of the at least one functional layer.

7. The electrical strip according to claim 1,
wherein the at least one additional layer consists at least partially, preferably completely, of an austenitic alloy or an austenitic steel.

8. The electrical strip according to claim 1,
wherein the at least one additional layer consists at least partially, preferably completely, of a non-metallic material, preferably a carbon (C)-containing material, particularly preferably graphene or graphite.

9. The electrical strip according to claim 1,
wherein at least two functional layers have different ferromagnetic materials and/or when several additional layers are used, at least two additional layers have different non-magnetisable materials.

10. The electrical strip according to claim 1, wherein the material properties vary in the at least one functional layer and/or in the at least one additional layer.

11. An arrangement of electrical strips, in particular electrical sheets, claim 1, wherein at least two electrical strips are arranged in a stack and a separating layer is provided between at least two electrical strips.

12. An iron core, comprising the electrical strip according to claim 1.

13. A method of manufacturing an electrical strip, in particular an electrical sheet claim 1, in which at least one functional layer is provided, wherein the at least one functional layer at least partially, preferably completely, consisting of a ferromagnetic material, in which at least one additional layer is provided, wherein the at least one additional layer at least partially, preferably completely, consisting of a non-magnetisable material, in which the at least one functional layer and the at least one additional layer are arranged adjacent to one another, in which an adhesive bond with atomic diffusion is created between the at least one functional layer and the at least one additional layer by applying pressure, and in which at least one functional layer has a thickness in the range from 2 to 100 μm, preferably from 2 to 60 μm.

14. The method according to claim 13, in which at least one of the at least one functional layer and/or at least one of the at least one additional layer are heat-treated.

15. The method according to claim 13, in which the at least one functional layer and the at least one additional layer are joined together by means of cold roll cladding or by means of hot cladding.

* * * * *